United States Patent
Watabe et al.

(10) Patent No.: US 8,077,586 B2
(45) Date of Patent: Dec. 13, 2011

(54) OPTICAL RECORDING HEAD DEVICE, OPTICAL RECORDING APPARATUS, AND RECORDING METHOD

(75) Inventors: Kazuo Watabe, Yokohama (JP); Takashi Usui, Yokohama (JP); Keiichiro Yusu, Yokohama (JP); Chosaku Noda, Yokohama (JP); Kazuto Kuroda, Yokohama (JP); Nobuaki Kaji, Yokohama (JP); Masahiro Saito, Yokohama (JP)

(73) Assignee: Kabushiki Kaisha Toshiba (JP)

( * ) Notice: Subject to any disclaimer, the term of this patent is extended or adjusted under 35 U.S.C. 154(b) by 313 days.

(21) Appl. No.: 12/257,213

(22) Filed: Oct. 23, 2008

(65) Prior Publication Data

US 2009/0103422 A1 Apr. 23, 2009

(30) Foreign Application Priority Data

Oct. 23, 2007 (JP) .................................. 2007-275391
Feb. 15, 2008 (JP) .................................. 2008-035174

(51) Int. Cl.
*G11B 7/00* (2006.01)
(52) U.S. Cl. ........................................ 369/116; 369/47.5
(58) Field of Classification Search ........................ None
See application file for complete search history.

(56) References Cited

U.S. PATENT DOCUMENTS

| 4,641,312 | A | * | 2/1987 | Schafer et al. | .................. | 372/25 |
| 5,719,372 | A | * | 2/1998 | Togari et al. | ............. | 219/121.61 |
| 6,567,440 | B1 | | 5/2003 | Hirata et al. | | |
| 6,580,737 | B1 | * | 6/2003 | Hirata et al. | ............... | 372/45.01 |

FOREIGN PATENT DOCUMENTS

| JP | 09-050629 | 2/1997 |
| JP | 2002-123963 | 4/2002 |
| JP | 2002-184010 | 6/2002 |
| JP | 2002-368329 | 12/2002 |
| JP | 2003-017799 | 1/2003 |
| JP | 2003-046190 | 2/2003 |

(Continued)

OTHER PUBLICATIONS

Combined Search and Examination Report for U.K. application No. GB0817910.3 issued by the U.K. Intellectual Property Office on Dec. 15, 2008.
Office Action for Japanese Application No. 2008-035174, mailed Jan. 6, 2009.
Notification of Reasons for Rejection issued by JPO in the corresponding to the Japanese Patent Application No. 2008-035174 on Apr. 14, 2009.

*Primary Examiner* — Lixi C Simpson
(74) *Attorney, Agent, or Firm* — Knobbe, Martens, Olson & Bear LLP (57) ABSTRACT

According to one embodiment, an optical recording head device includes a light source which outputs such a relaxation oscillation optical pulse that a full width at half maximum of a single pulse is 820 ps or less, a driving unit for driving the light source, an objective lens which converges emission light from the light source on a recording layer of a recording medium, and captures reflective light which is reflected by the recording layer of the recording medium, a distribution unit, placed between the light source and the objective lens, for distributing incident light, and a photodetection unit for receiving via the distribution unit the reflective light which is reflected by the recording layer of the recording medium, wherein a resonator length of the light source is 6560 μm or less.

6 Claims, 8 Drawing Sheets

FOREIGN PATENT DOCUMENTS

| | | |
|---|---|---|
| JP | 3558747 | 5/2004 |
| JP | 2005-025873 | 1/2005 |
| JP | 2005-209988 | 8/2005 |
| JP | 2006-134422 | 5/2006 |
| JP | 2007-522594 | 8/2007 |
| WO | WO 03/005515 A1 | 1/2003 |
| WO | WO 2005/081236 A1 | 9/2005 |
| WO | WO 2005081236 A1 * | 9/2005 |

* cited by examiner

F I G. 1

Direction of light incidence

OPTICAL RECORDING HEAD DEVICE, OPTICAL RECORDING APPARATUS, AND RECORDING METHOD

CROSS-REFERENCE TO RELATED APPLICATIONS

This application is based upon and claims the benefit of priority from Japanese Patent Applications No. 2007-275391, filed Oct. 23, 2007; and No. 2008-035174, filed Feb. 15, 2008, the entire contents of both of which are incorporated herein by reference.

BACKGROUND

1. Field

One embodiment of the present invention relates to an optical recording head device, an optical recording apparatus and a recording method.

2. Description of the Related Art

A DVD (digital versatile disc) is well known as an optical disc which stores digital video. DVDs are widely used all over the world as media (digital publication products) which mainly store and distribute cinema content. Besides, optical discs having greater capacities than the DVD (referred to as "conventional DVD") have been realized.

In the field of optical discs, there is a strong demand for a higher transfer rate as well as a larger capacity. As regards an HD DVD-R and an HD DVD-RW, 2× speed specifications, relative to standard 1× speed specifications (linear velocity=6.61 m/s), have already been published. In the near future, a further increase in transfer rate, such as 4× speed or 8× speed, is expected.

When data is recorded on an optical disc, if a peak current for obtaining a predetermined peak power is applied to a laser light source for a predetermined time period, the output intensity of the laser light source is raised to a recording power level with the application of the peak current. At the time when the output intensity of the laser light source is raised to the recording power, the intensity instantaneously rises and falls until the recording power becomes stable at a normal recording power level. This occurs due to relaxation oscillation. In usual recording pulse generation, this relaxation oscillation is controlled to decrease to a minimum.

There have conventionally been disclosed a laser driving method for recording a mark string on an optical disc by making use of the above-described relaxation oscillation, and an optical disc apparatus using this method (see Jpn. Pat. Appln. KOKAI Publication No. 2002-123963).

In the recording method disclosed in KOKAI No. 2002-123963, however, a mark string is recorded on the optical disc by making use of both ordinary recording pulses and relaxation oscillation. As regards the cycle of relaxation oscillation, this document only describes that the cycle is about 2 GHz to 4 GHz, and is silent on the relation to the physical specifications of the laser light source.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an optical recording head device includes a light source which outputs such a relaxation oscillation optical pulse that has a duration between a first time when a first amplitude is half of a peak amplitude of a single pulse and a second time when a second amplitude is half of the peak amplitude of the single pulse, e.g. full width at half maximum of the single pulse, of 820 ps or less; driving means for driving the light source; an objective lens which converges emission light from the light source on a recording layer of a recording medium, and captures reflective light which is reflected by the recording layer of the recording medium; distribution means, placed between the light source and the objective lens, for distributing incident light; and photodetection means for receiving via the distribution means the reflective light which is reflected by the recording layer of the recording medium, wherein a resonator length of the light source is 6560 µm or less.

Figure 1:
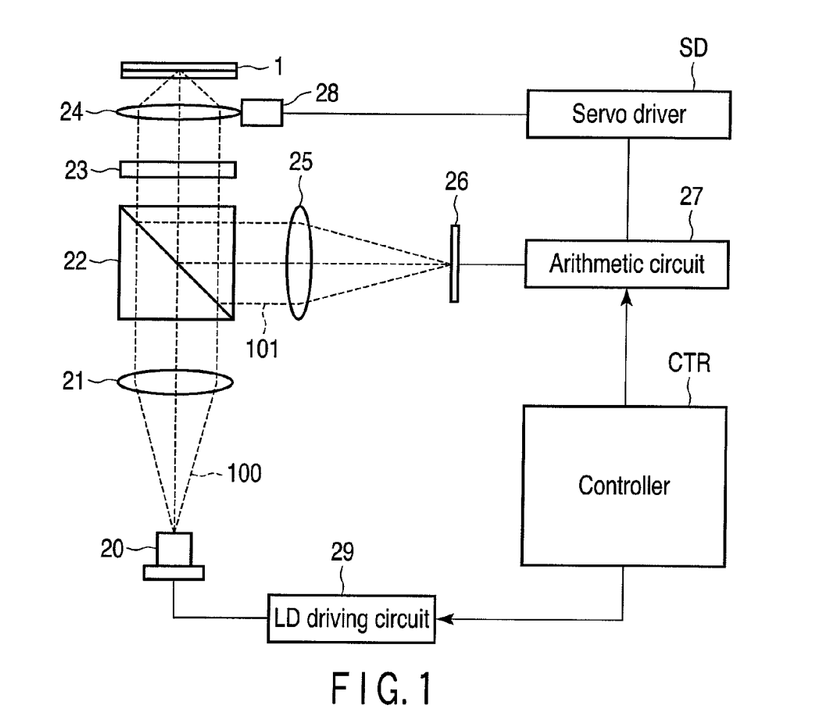
FIG. 1 schematically shows a structure example of an optical recording apparatus according to an embodiment of the present invention.

An optical recording apparatus according to an embodiment of the present invention will now be described with reference to the accompanying drawings. FIG. 1 shows a structure example of an optical recording apparatus according to the embodiment of the invention. In the optical recording apparatus of this embodiment, a semiconductor laser 20 with a short wavelength is used for a light source. The wavelength of emission light of the semiconductor laser 20 falls in a violet wavelength band in a range of, e.g. 400 nm to 410 nm.

Emission light 100 from the semiconductor laser light source 20 is converted to plane wave via a collimator lens 21, and passes through a polarization beam splitter 22 and a quarter wave plate 23. The light emerging from the quarter wave plate 23 passes through an objective lens 24. Then, the light passes through a substrate of an optical disc 1 and converges on a target information recording layer. Reflective light 101, which is reflected by the information recording layer of the optical disc 1, passes through a cover layer 4 of the optical disc 1, and then passes through the objective lens 24 and quarter wave plate 23. The light emerging from the quarter wave plate 23 is reflected by the polarization beam splitter 22, and is made incident on a photodetector 26 via a focusing lens 25.

The light-receiving section of the photodetector 26 is normally divided into a plurality of light-receiving parts, and electric currents corresponding to light intensity are output from the respective light-receiving parts. The output current is converted to a voltage by an I/V amplifier (not shown), and the voltage is delivered to an arithmetic circuit 27. The arithmetic circuit 27 executes an arithmetic process to generate an HF signal for reproducing user data information, and a focus error signal and a track error signal for controlling a beam spot position on the optical disc 1. The arithmetic circuit 27 is controlled by a controller CTR.

The objective lens 24 can be driven by an actuator 28 in an axial direction and a disc radial direction, and is controlled by a servo driver SD so as to trace an information track on the optical disc 1. The optical disc 1 is a recordable disc, and information is recorded on the optical disc 1 by the emission light 100 of the semiconductor laser 20. The amount of the emission light 100 of the semiconductor laser 20 can be controlled by a semiconductor laser driving circuit 29. At a time of information recording on the optical disc 1, the semiconductor laser 20 is controlled so as to emit a relaxation oscillation pulse. The semiconductor laser driving circuit 29 is controlled by the controller CTR. The recording pulse at the time of information recording on the optical disc 1 will be described later in detail.

Figure 2:
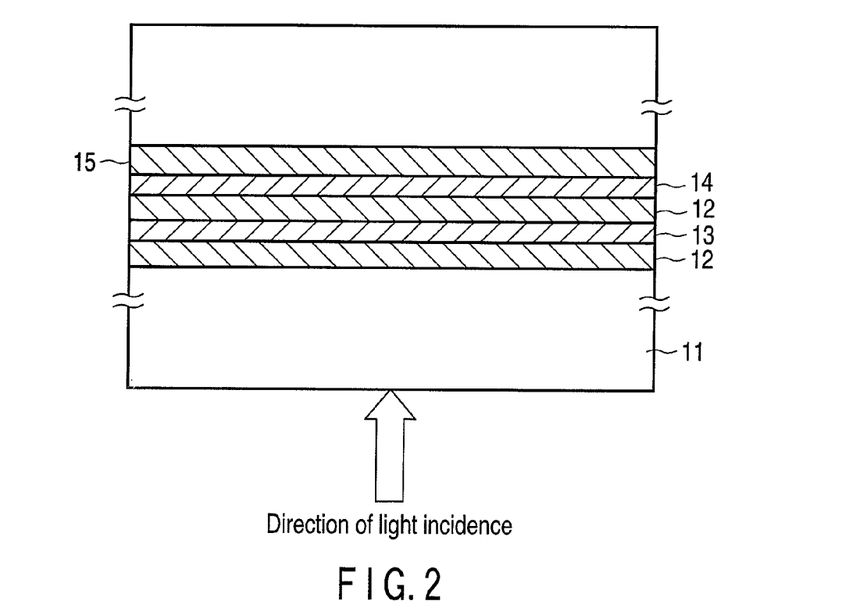
FIG. 2 shows an example of the cross section of an optical disc which is used in the embodiment of the invention.

FIG. 2 shows an example of the cross section of the optical disc 1 which is used in the optical recording apparatus according to the embodiment. A recording layer 13, which is, for instance, a phase-change recording film, is formed on a substrate 11 of polycarbonate via a protection layer 12 which is formed of a dielectric material. Another protection layer 12 of a dielectric material is formed on the recording layer 13, and an electrically conductive reflective layer 14 is formed on the protection layer 12. Further, another substrate 11 of polycarbonate is formed on the reflective layer 14 via an adhesive layer 15.

The entire structure of the optical disc 1 is configured such that two discs are attached in opposite directions, with at least one of the two discs having an information recording layer including a recording film being formed on a substrate thereof. The thickness of the substrate of each disc is, e.g. about 0.6 mm, and the thickness of the entire optical disc 1 is about 1.2 mm.

This embodiment shows an example of the optical disc in which an information recording layer comprises four layers. The invention, however, is applicable to an optical disc in which an information recording layer comprises five or more layers, for example, such that interface layers are provided on upper and lower sides of the recording layer 13. In the present embodiment, a single information recording layer is provided by way of example. Alternatively, the invention is applicable to an optical disc having two or more information recording layers. Besides, in the present embodiment, a discoid optical disc is used as a recording medium, but the invention is applicable to, for instance, a card-shaped recording medium.

Figure 3:
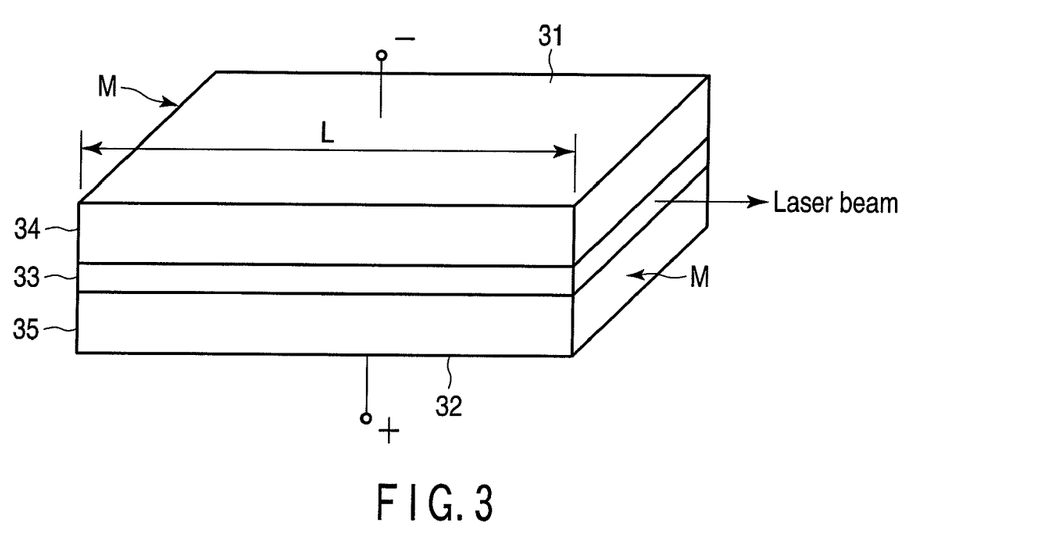
FIG. 3 shows an example of a semiconductor laser which is used for a light source in the optical recording apparatus according to the embodiment of the invention.

FIG. 3 shows an example of the semiconductor laser 20 which is used for the light source in the optical recording apparatus according to the embodiment. FIG. 3 shows only a semiconductor chip portion which becomes a light emission body of the semiconductor laser. Normally, this chip portion is fixed to a metal block which becomes a heat sink, and the semiconductor laser further includes a base member, a glass window-equipped cap, etc.

This description is given with reference to only the semiconductor chip portion which is directly related to laser light emission. For example, the semiconductor laser chip is a micro-block having a thickness (in an up-and-down direction in FIG. 3) of about 0.15 mm, a length (L in FIG. 3) of about 0.5 mm, and a lateral width (in a depth direction in FIG. 3) of about 0.2 mm. An upper end 31 and a lower end 32 of the laser chip constitute electrodes, respectively. The upper end 31 is a − (negative) electrode, and the lower end 32 is a + (positive) electrode.

A central active layer 33 emits a laser beam. An upper clad layer 34 and a lower clad layer 35 are formed on an upper side and a lower side of the active layer 33. The upper clad layer 34 is an n-type clad layer in which a great number of electrons are present, and the lower clad layer 35 is a p-type clad layer in which a great number of holes are present.

If a voltage is applied between the electrode 32 and the electrode 31 in a forward direction from the electrode 32 to the electrode 31, that is, if a current is caused to flow from the electrode 32 toward the electrode 31, many holes and electrons, which are excited in the active layer 33, are recombined, and light corresponding to the energy that is lost at this recombination is emitted. The material of the upper clad layer 34 and lower clad layer 35 is chosen such that the refractive index of the upper clad layer 34 and lower clad layer 35 is lower (e.g. by 5%) than the refractive index of the active layer 33. The light that is generated in the active layer 33 becomes a light wave which propagates in the active layer 3 in the left-and-right direction in FIG. 3 while being reflected at the boundaries between the active layer 33 and the upper and lower clad layers 34 and 35.

The left and right end faces in FIG. 3 are mirror surfaces M, and the active layer 33 itself constitutes an optical resonator. The light wave, which propagates in the left-and-right direction in the active layer 33 and is reflected by the mirror surfaces at both the left and right ends, is amplified within the active layer 33, and the amplified light wave is finally emitted as a laser beam from the right end (and left end) in FIG. 3. At this time, the resonator length of the semiconductor laser 20 is a length L in the left-and-right direction in FIG. 3.

The emission waveform of the semiconductor laser 20 is controlled by a driving current that is generated by the semiconductor laser (LD: Laser Diode) driving circuit 29. The generation of recording pulses, which are used in the recording on the optical disc 1, by the driving current of the LD driving circuit 29 is described with reference to FIG. 4A to FIG. 4D.

Figure 4A:
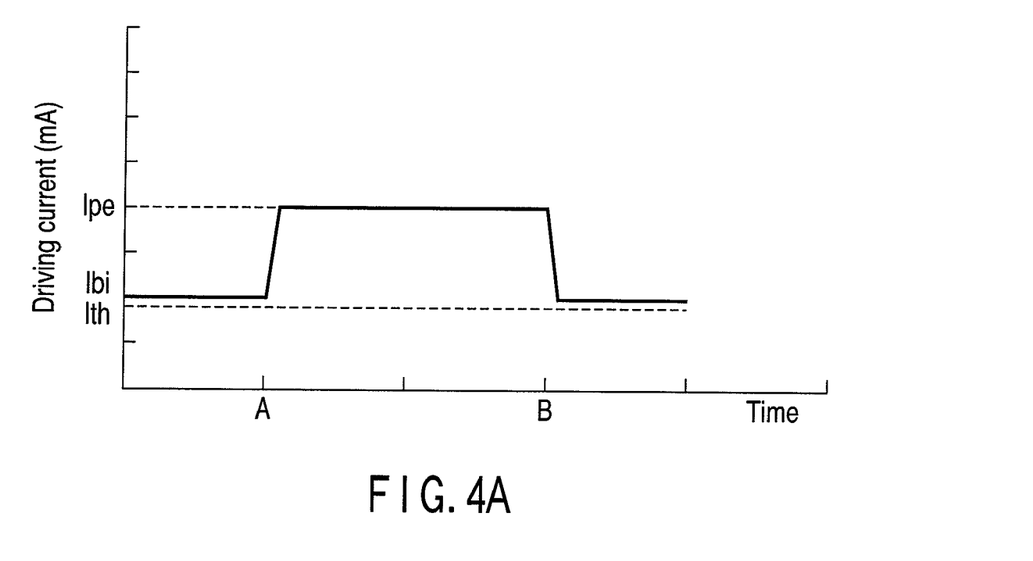
FIG. 4A shows an example of the waveform of a driving current of the semiconductor laser when conventional recording is performed.
Figure 4B:
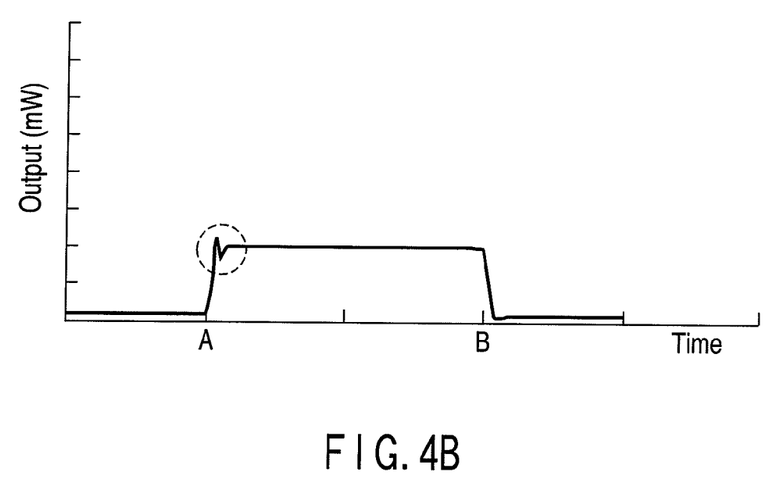
FIG. 4B shows an example of the emission waveform of the semiconductor laser when conventional recording is performed.
Figure 4C:
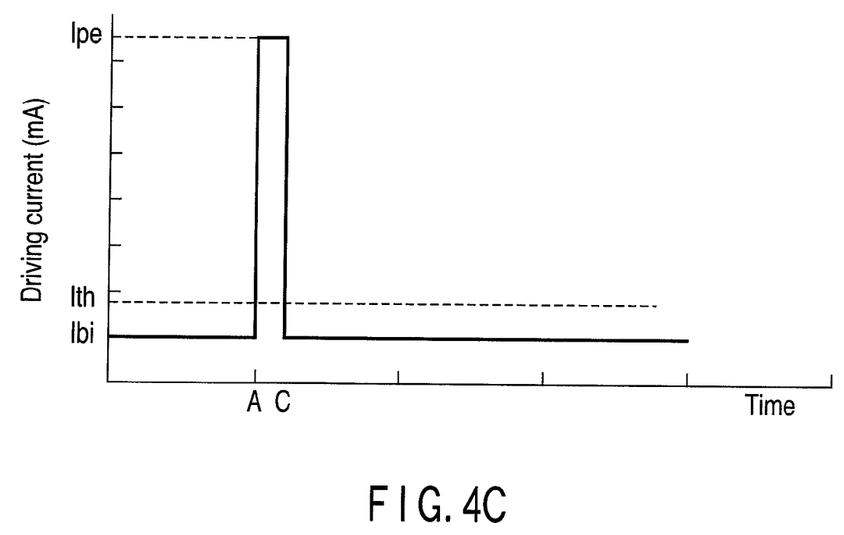
FIG. 4C shows an example of the waveform of a driving current of the semiconductor laser when a relaxation oscillation pulse is generated.
Figure 4D:
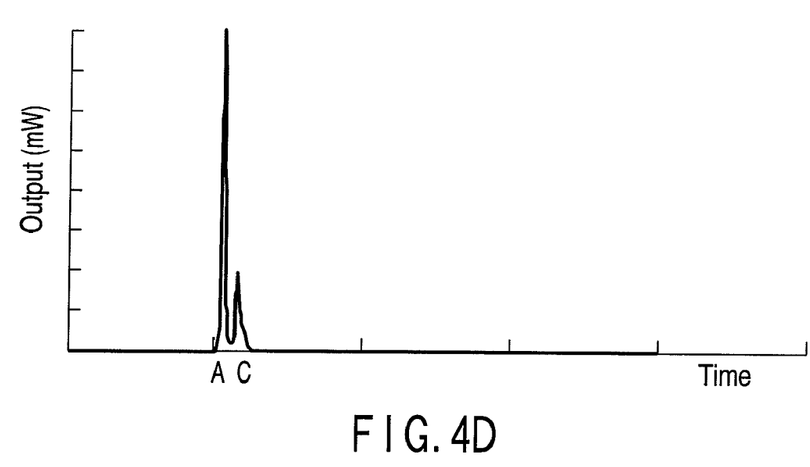
FIG. 4D shows an example of the emission waveform of the semiconductor laser when a relaxation oscillation pulse is generated.

FIG. 4A and FIG. 4B show a conventional LD driving current and a conventional LD emission waveform. FIG. 4C and FIG. 4D show an LD driving current and an LD emission waveform at a time when a relaxation oscillation pulse is generated. The driving current is controlled at two levels of a bias current Ibi and a peak current Ipe shown in FIG. 4A and FIG. 4C. There are cases in which the bias current is controlled at further divided two or three levels. In this case, however, for the purpose of simple description, it is assumed that a single level bias current Ibi and a single level peak current Ipe are used.

In the case of conventional recording pulse generation, the LD driving circuit 29, as shown in FIG. 4A, first generates a bias current Ibi which is set at a level slightly higher than a threshold current Ith at which the semiconductor laser 20 starts laser oscillation, and drives the semiconductor laser 20. Then, at a time point A, a peak current Ipe for obtaining a desired peak power is applied. The peak current Ipe is applied for a predetermined time period. At a time point B, the current level is lowered once again to the bias current Ibi. FIG. 4B shows a time-based variation of the emission light intensity of the semiconductor laser 20 at this time.

As shown in FIG. 4B, until the time point A until which the semiconductor laser 20 is driven by the bias current Ibi, the emission light intensity remains at a very low level at which data recording on the optical disc 1 is disabled. With the application of the peak current Ipe, the output level is raised up to the recording power level. This power level is maintained until the driving current is lowered to the bias current Ibi level at the time point B. After the time point B, the emission light intensity is kept once again at the low power level. In this manner, the semiconductor laser 20 is controlled so as to emit a recording pulse in the period from the time point A to the time point B.

If the emission light intensity is observed more specifically, when the intensity is raised up to the recording power at the time point A, it is observed that the intensity instantaneously rises and falls until the intensity is stabilized at the normal recording power (a region encircled by a broken line in FIG. 4B). This is due to relaxation oscillation of the semiconductor laser 20. In the conventional recording pulse generation, control is executed to minimize this relaxation oscillation.

The relaxation oscillation is a transitional oscillation phenomenon which occurs when the driving current sharply increases from a certain level to a predetermined level exceeding a threshold current level in the laser. The relaxation oscillation gradually decreases as the oscillation repeats, and at last the oscillation fades away.

In the optical recording apparatus according to the embodiment, this relaxation oscillation is positively utilized for recording. In the case of using the relaxation oscillation as a recording pulse, as shown in FIG. 4C, the LD driving circuit 29 first generates a bias current Ibi which is set at a level lower than the threshold current Ith of the semiconductor laser 20, and drives the semiconductor laser 20.

Subsequently, at the time point A, the driving current is sharply raised up to the peak current level Ipe with a quicker rising time than in the case of the conventional recording pulse generation. Then, at a time point C, the current level is lowered to the bias current Ibi level after a shorter time than in the case of the conventional recording pulse generation. FIG. 4D shows a time-based variation of the emission light intensity of the semiconductor laser 20 at this time.

As shown in FIG. 4D, until the time point A until which the semiconductor laser 20 is driven by the bias current Ibi that is lower than the threshold current Ith, the semiconductor laser 20 does not start laser oscillation, and light emission of the light-emitting diode with a negligible level is performed. Then, with the sharp current application at the time point A, relaxation oscillation begins and the emission light intensity sharply increases. The light emission by the relaxation oscillation is maintained until the time point C at which the applied current level is restored to the level below the threshold current level. In the case of this example, the time point C is reached at the timing at which the second-cycle pulse of the relaxation oscillation is generated, and the recording pulse generation is finished.

As has been described above, the pulse by the relaxation oscillation is characterized in that the emission light intensity increases in a very short time, compared to the case of the conventional recording pulse, and the emission light intensity lowers with a fixed cycle that is determined by the structure of the semiconductor laser. Therefore, by using the pulse by the relaxation oscillation for the recording pulse, it becomes possible to obtain a short pulse having a quick rising/falling time and a high peak intensity, which cannot be obtained with the conventional recording pulse.

The LD resonator length L and the relaxation oscillation cycle T have the following generally known relationship:

$$T = k \cdot \{2\, nL/c\} \qquad (1)$$

where k is a constant, n is a refractive index of the active layer of the semiconductor laser, and c is the velocity of light ($3.0 \times 10^8$ (m/s)). It is thus understood that the LD resonator length L is proportional to the relaxation oscillation cycle T and, accordingly, to the relaxation oscillation pulse width.

From the above, it is understood that the relaxation oscillation pulse width can be increased by increasing the LD resonator length L, and the relaxation oscillation pulse width can be decreased by decreasing the LD resonator length L. In short, the relaxation oscillation pulse width can be controlled by the LD resonator length L.

Figure 5:
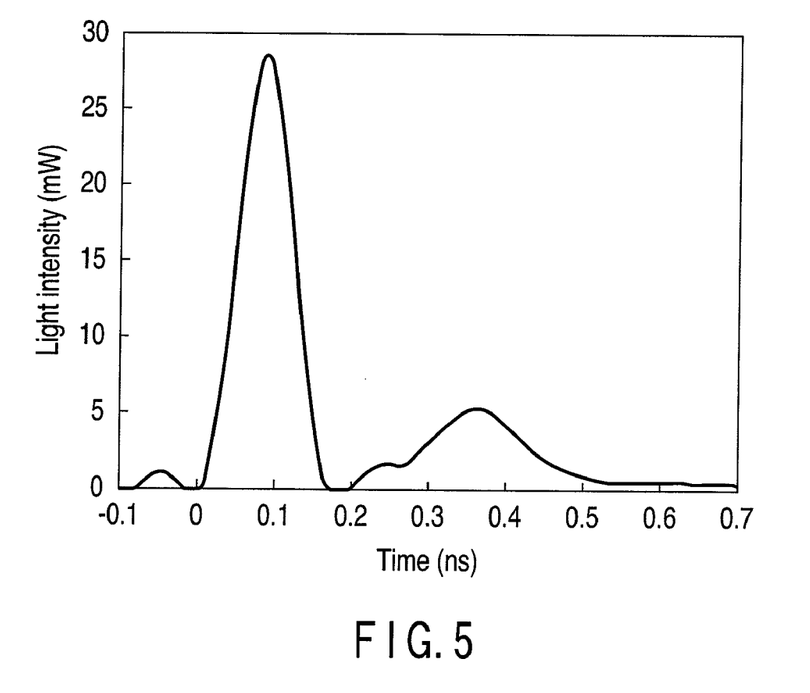
FIG. 5 shows an example of a measurement result of the relaxation oscillation waveform by a semiconductor laser in which the resonator length is 650 µm.

FIG. 5 shows a measurement result of the waveform of the relaxation oscillation by a semiconductor laser having a resonator length L of 650 μm. It is understood that the relaxation oscillation pulse width is about 81 ps at a duration between a first time when a first amplitude is half of a peak amplitude and a second time when a second amplitude is half of the peak amplitude, e.g. full width at half maximum. Since it is understood from the above equation (1) that the LD resonator length L and the relaxation oscillation pulse width have the proportional relationship, the following relationship is obtained as a transformation equation of the resonator length L of the semiconductor laser and the relaxation oscillation pulse width (FWHM) Wr:

$$Wr(\text{ps}) = L(\mu\text{m})/8.0\, (\mu\text{m/ps}) \qquad (2)$$

Next, a description is given of the recording of data on an optical recording medium in the optical recording apparatus according to the present embodiment. The optical disc 1 is a rewritable disc such as a DVD-RAM, a DVD-RW, an HD DVD-RW, or an HD DVD-RAM. A phase-change material is used for the recording layer. In the phase-change type optical disc, the recording and erasure of data bits are executed by controlling the intensity of a pulsating laser beam which is converged on the recording layer.

To record means that to form an amorphous mark in an area of the recording layer, which is initialized in a crystal state. The amorphous mark is formed by melting the phase-change material and, immediately thereafter, quickly cooling the molten phase-change material. To achieve this, it is necessary to converge a relatively short, high-power pulsating laser beam on the phase-change recording layer, to raise the local temperature to a level above a melting point Tm of the phase-change material, and to cause local melting. Then, if the recording pulse is stopped, the molten local area is quickly cooled, and a solid amorphous mark is formed through a melting/quick-cooling process.

On the other hand, erasure of a recorded data bit is executed by recrystalling the amorphous mark. At this time, crystallization is induced by local annealing. A laser beam is converged on the recording layer, with the laser beam power being controlled at a level slightly lower than the recording power level. Thereby, the local temperature of the phase-change recording layer is increased up to a crystallization temperature Tg or above, and is kept at a temperature below the melting point Tm.

At this time, by keeping the local temperature between the crystallization temperature Tg and the melting point Tm for a sufficient time period, the amorphous mark can be phase-changed to the crystal state. Thus, the recording mark can be erased.

The time period in which the local temperature is to be kept between the crystallization temperature Tg and the melting point Tm, which is required for the crystallization, is referred to as "crystallization time". When the recorded data bit is to be reproduced, a DC laser beam, which has such a low power as to cause no phase change in the recording layer, that is, a read power, is applied to the information recording layer.

Figure 6A:
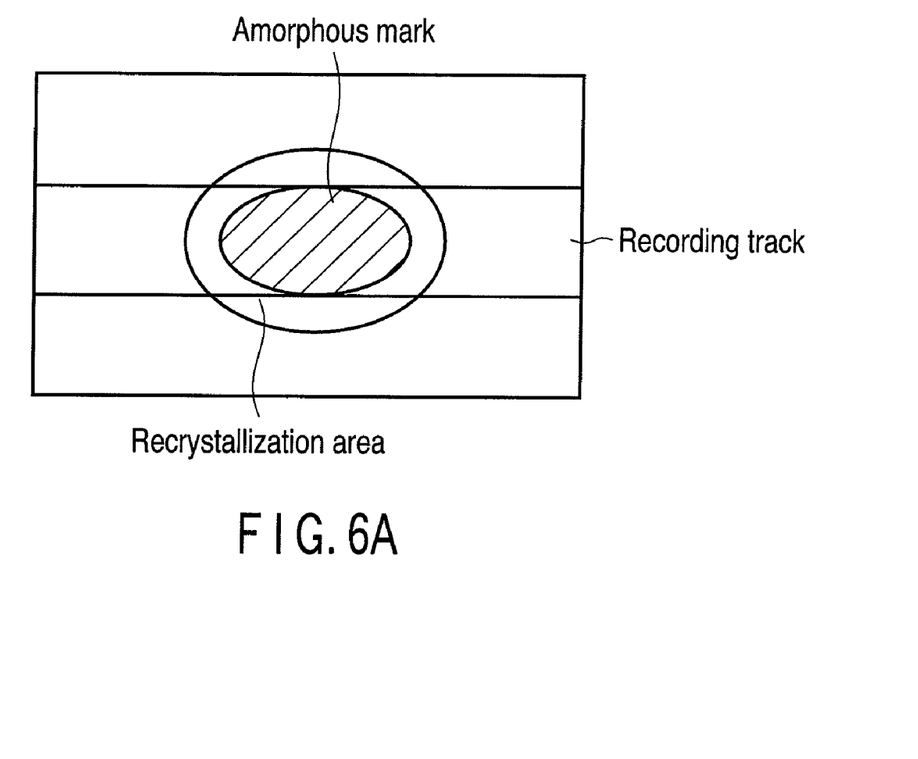
FIG. 6A is a view for describing an amorphous mark which is formed by a conventional recording pulse.

The optical recording apparatus according to the present embodiment is characterized in that a short pulse, such as a relaxation oscillation pulse, is used as the recording pulse for recording a data bit. As shown in FIG. 6A, when an amorphous mark is formed by a conventional recording pulse through the above-described melting/quick-cooling process of the phase-change material, an annular area (recrystallization ring) of recrystallization occurs at a peripheral part of the amorphous mark.

The reason is that the area, which is once melted at the peripheral part of the amorphous mark, is kept in the temperature region between the crystallization temperature Tg and the melting point Tm for the crystallization time or more in the cooling process, and is thus recrystallized. Although this recrystallization brings about an effect (self-sharpening effect) by which the size of the amorphous mark decreases as a result, this may lead to, in some cases, jitter (fluctuation) of a production signal at the mark peripheral part, thermal interference between marks which are formed in a back-and-forth direction on the track, and partial erasure (cross-erase) of the mark formed on a neighboring track.

Figure 6B:
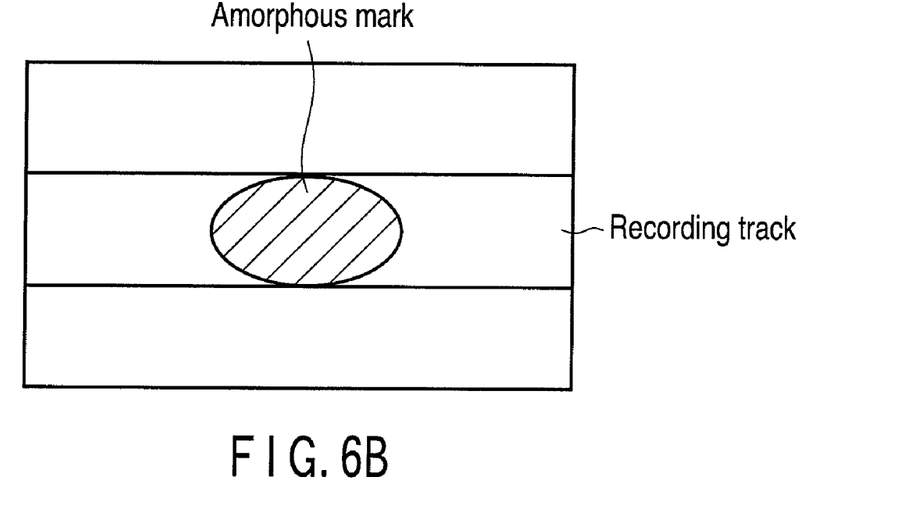
FIG. 6B is a view for describing an amorphous mark which is formed by a short pulse.

On the other hand, as shown in FIG. 6B, the amorphous mark, which is formed by the short pulse, such as the relaxation oscillation pulse, in the optical recording apparatus of the present embodiment, has practically no recrystallization ring at the peripheral part of the amorphous mark. The reason for this is that since the high-power laser beam is radiated in a short time by the short pulse, the phase-change layer is melted immediately after the radiation of the laser beam, and the radiation of the laser beam is finished before the molten area significantly spreads to the peripheral part due to heat conduction, and thus only the molten area immediately after the laser beam radiation is made into the amorphous mark.

As has been described above, the amorphous mark by the short pulse, in which no recrystallization ring occurs, has such advantages that jitter at the mark peripheral part decreases, there occurs no mark deformation or edge shift due to thermal interference between marks which are formed in a back-and-forth direction on the track, and there occurs no cross-erase of the mark formed on a neighboring track.

Needless to say, aside from the above-described advantage of the quality improvement of the recording mark, the recording by the short pulse has such an advantage that since the mark can be recorded in a short time, the recording by the short pulse is suited to high-transfer-rate recording.

In the field of optical discs, there is a strong demand for a higher transfer rate as well as a larger capacity. As regards an HD DVD-R and an HD DVD-RW, 2× speed specifications, relative to standard 1× speed specifications (linear velocity=6.61 m/s), have already been published. In the near future, a further increase in transfer rate, such as 4× speed or 8× speed, is expected.

In order to achieve the high transfer rate, it is necessary to record recording marks at high speed, that is, in a short time. In the case of the phase-change type disc, this means that the amorphous mark is recorded by the short pulse. For example, in the case of the HD DVD, if the 8× speed is adopted, the channel clock rate becomes 518.4 Mbps, and the time corresponding to 1 channel bit becomes 1.929 ns.

The pulse width, which is required for the short pulse recording in the optical recording apparatus of the present embodiment, is such a pulse width as not to cause a recrystallization ring when the amorphous mark is formed. As described above, the area, which becomes the recrystallization ring at the time of forming the amorphous mark, is the area which is once melted at the peripheral part of the amorphous mark, that is, the area that is heated above the melting point of the phase-change material. At this time, only the area, whose temperature slightly exceeds the melting point, is recrystallized.

The reason for this is that the area, which is heated up to a temperature much higher than the melting point, is made amorphous since the gradient of the temperature decrease in this area is large and this area is cooled relatively quickly. This is because the heat flow amount from a high temperature region to a low temperature region becomes larger as the temperature gradient is greater, as is understood from the well-known relationship (Fourier's law of heat conduction) between a temperature gradient $\delta T/\sigma x$ and a heat flow density $q(W/m^2)$, i.e. $q=K \cdot \delta T/\sigma x$. In this equation, $K(W/m \cdot K)$ is a coefficient of thermal conductivity, and x is the distance in the direction of heat conduction (normal vector direction at interface) at the interface having a temperature difference.

Figure 7A:
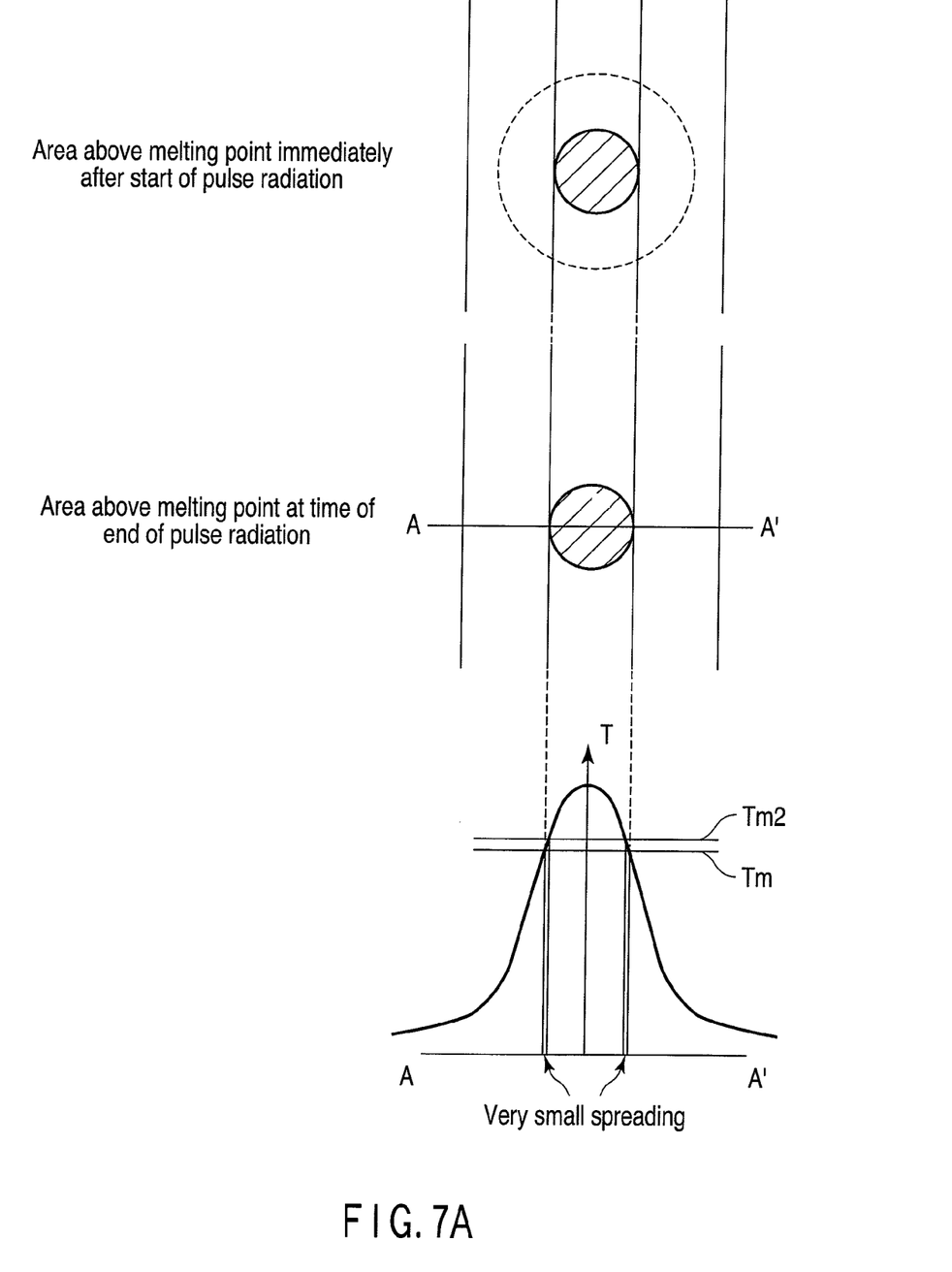
FIG. 7A is a view for describing an example of a temperature distribution on a recording track in the case of short-pulse recording.
Figure 7B:
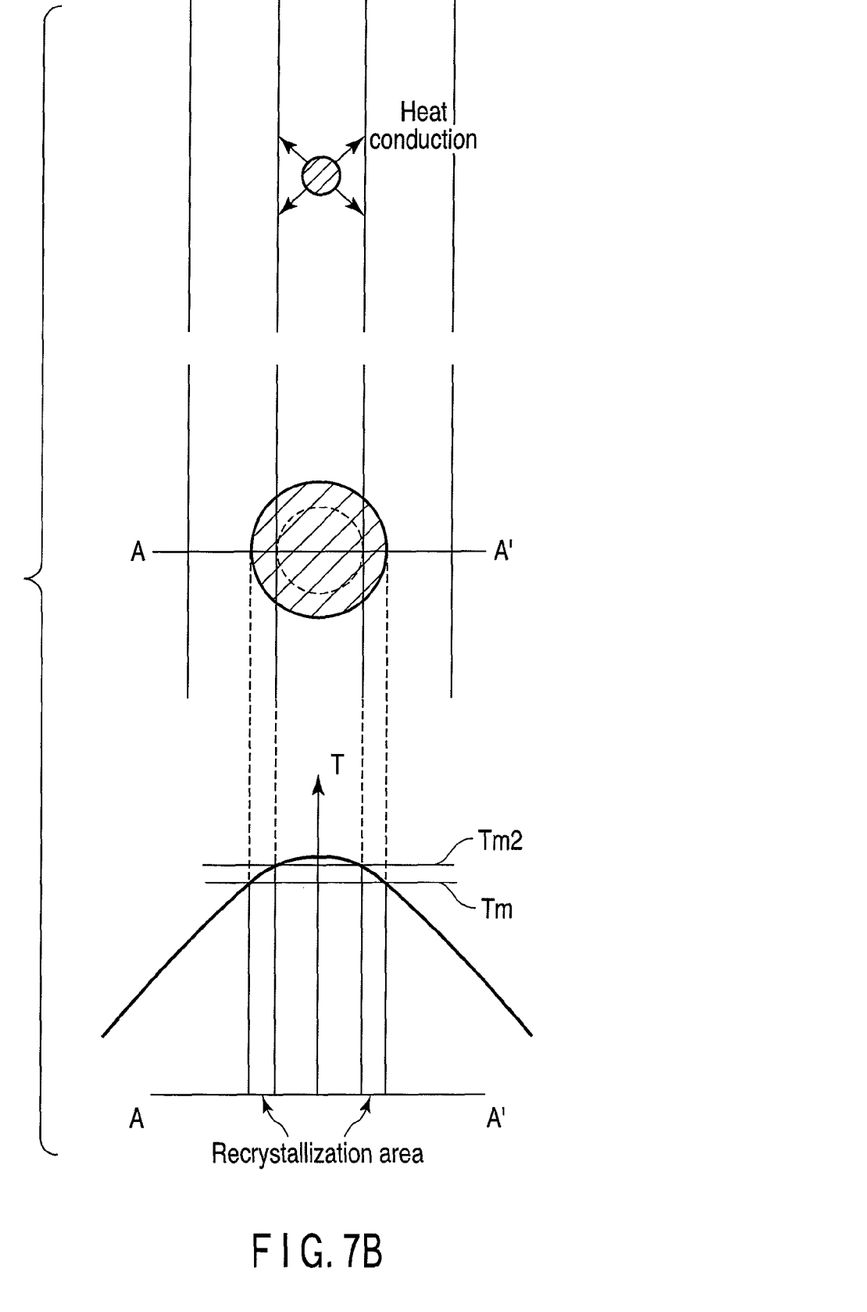
FIG. 7B is a view for describing an example of a temperature distribution on a recording track in the case of recording by a conventional recording pulse.

In the case of the short pulse recording, a high-power laser beam is radiated so that the temperature of a beam spot center part may exceed the melting point immediately after the laser beam radiation. FIG. 7A and FIG. 7B are views for explaining temperature distributions on recording tracks. In FIG. 7A and 7B, an upper part shows an area above a melting point on a track immediately after recording pulse radiation, a middle part shows an area above the melting point at the time of the end of the recording pulse, and a lower part shows a temperature distribution in a cross section taken along line A-A' in the middle part.

FIG. 7A shows the case of short pulse recording, and FIG. 7B shows the case of recording by a conventional recording pulse. Actually, a recording beam spot (an area indicated by a broken line in FIG. 7A) moves in the up-and-down direction in FIG. 7A during the pulse radiation. In this example, however, for the purpose of simple description, it is assumed that the recording beam spot does not move.

In each case of the recording pulses, the beam spot center area above the melting point spreads by heat conduction during the time period from a time point immediately after the pulse radiation to a time point of the end of the pulse radiation. However, in the case of the short pulse, since the pulse radiation time is short, the beam spot center area hardly spreads.

In the case of the short pulse recording, the temperature distribution in the cross section including the beam sport center at the time of the end of the pulse radiation is a Gaussian distribution which is substantially the same as the temperature distribution immediately after the light beam radiation. A sharp temperature gradient appears at the region of a boundary above and below the melting point. Thus, the area of recrystallization, that is, the area having a temperature between the melting point Tm and a temperature Tm2 in FIG. 7A, has little spreading in the planar direction. A temperature Tm2 is the point slightly above the melting point. Accordingly, if the laser power becomes zero within such a time period that the spreading of the beam spot center area above the melting point due to the heat conduction is negligible, the recrystallization ring is limited to a very narrow area.

On the other hand, in the case of the mark formation by the conventional recording pulse, a relatively low power is radiated for a long time, and consequently the area above the melting point at the beam spot center gradually spreads (from the upper part to the middle part in FIG. 7B). In this case, the temperature distribution in the cross section including the beam sport center is no longer a Gaussian distribution, and has a shape with a gentler temperature gradient (the lower part in FIG. 7B).

Consequently, the recrystallized area has a relatively large spreading in the planar direction. A broken line in the middle part of FIG. 7B indicates a limit of recrystallization, and the area within the broken line becomes an amorphous mark area. Thus, in the conventional recording pulse, a large recrystallization ring occurs at the time of mark formation.

It is considered that the width of the recrystallization ring in the planar direction is substantially equal to the distance of spreading of the molten area in the planar direction in the pulse radiation time. Assuming that a general phase-change material has a coefficient of thermal conductivity, K=0.005 J/cm/s/° C., and specific heat C=1.5 J/cm$^3$/° C., it is possible to estimate the thermal diffusion distance in the pulse radiation time. In a time t, the heat diffuses over a typical distance $L=(Kt/C)^{1/2}$.

Thus, the upper limit of the pulse radiation time, which is required for the short pulse recording, is determined so that the width of the recrystallization ring in the planar direction is practically negligibly small.

Figure 9:
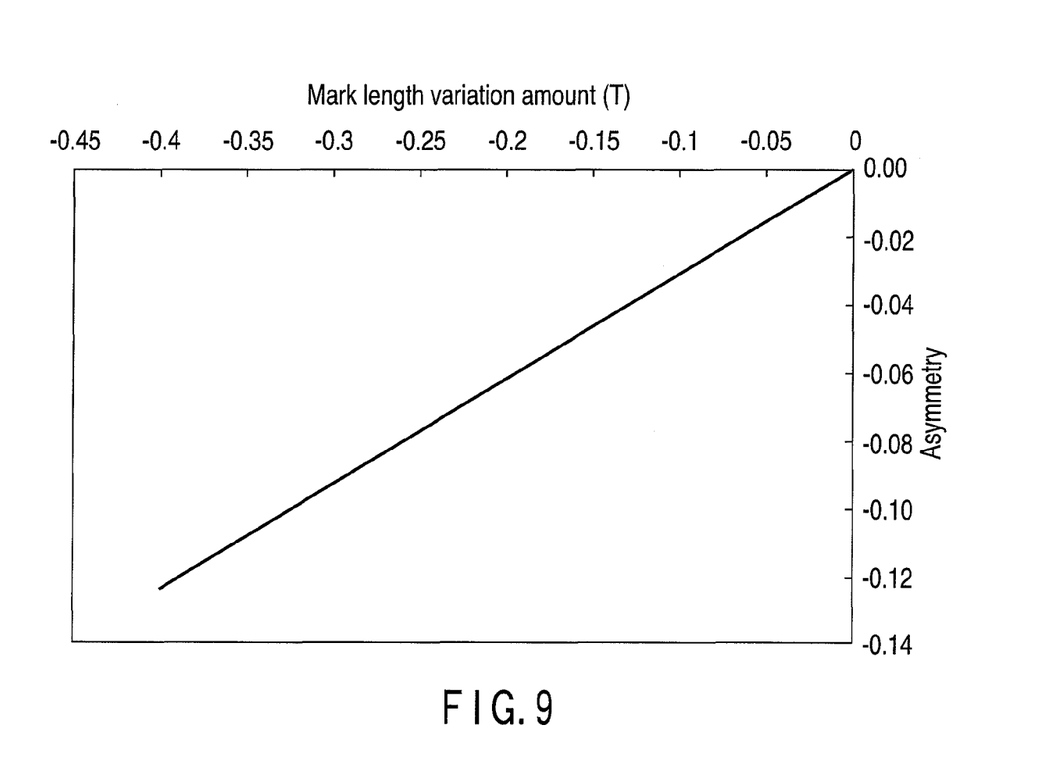
FIG. 9 is a graph for explaining an example of a tolerable range of a recrystallization ring.

FIG. 9 shows a relationship between asymmetry of a reproduction signal of an HD DVD-RW and a mark length variation amount (a negative sign indicates a direction in which the mark becomes shorter) of a shortest mark (2T: T is a channel bit length=0.102 μm). The asymmetry is a value obtained by dividing a difference between a signal center level of a lowest-density signal (11T) and a signal center level of a highest-density signal (2T), which are included in reproduction signals, by a lowest-density signal amplitude.

It is understood that if the absolute value of asymmetry is large, the error rate of reproduction signal data is high. In the HD DVD-RW, the limit value of asymmetry is ±0.10. As is understood from FIG. 9, if the mark length of the shortest mark varies (in this case, the mark length becomes shorter), the asymmetry increases in the negative direction. If the mark length varies by 0.325T (the mark length becomes shorter), the asymmetry reaches a lower limit of −0.10. Since 1T (channel bit length) is 0.102 μm, this variation of 0.325T corresponds to a variation of 33 nm.

In the short pulse recording, since it is assumed that the recrystallization ring occurs only up to a practically negligible level, it is required that the variation of the mark length due to the recrystallization ring be, at most, 33 nm or less.

Since the decrease in mark length due to the recrystallization ring must be considered to occur uniformly in the back-and-forth direction of the mark, it is required, in other words, that the width of the recrystallization ring be 16.5 nm or less. Since the pulse radiation time corresponding to the thermal diffusion distance of 16.5 nm is 0.82 ns from the above-described relationship, this is the upper-limit pulse width that is required for the short pulse recording.

As has been described above, since the equation (2) is obtained as the relationship between the resonator length L of the semiconductor laser and the obtained relaxation oscillation pulse width Wr, it is understood that the pulse width of 820 ps or less needs to be used for the short pulse recording, that is, the semiconductor laser having the resonator length of 6560 μm or less needs to be used.

The above-described conditions are applicable to the case in which the reduction in mark length occurs only due to the formation of the recrystallization ring. Actually, the possible factors of the occurrence of the mark length variation include an electric variation of the width of the driving pulse that is generated by the LD driving circuit, and a variation in disc movement speed (a rotational speed variation of the disc rotating motor), in addition to the factor of the disc recording film, that is, the formation of the recrystallization ring. If these three factors are thought to be equivalent and consideration is given to the situation that a variation due to the root sum square of these three factors corresponds to 0.10 that is the limit value of the above-described asymmetry absolute value, the conditions of the variation of the mark length, which occurs only due to the formation of the recrystallization ring, become more strict than in the above-described example. In order that the root sum square of the three factors may correspond to 0.10, the variation due to one variation factor is $((0.1^2)/3)^{1/2}=0.06$. From FIG. 9, the mark length variation, due to which the asymmetry variation of the absolute value of 0.06 occurs, is −0.2T. Accordingly, it can be said that the mark length variation should preferably be limited to the range of 10% or less of the minimum mark length 2T=0.204 μm of the HD DVD-RW, that is, the range of 10.2 nm or less in one direction. In order that the reduction in mark length may be limited to 10.2 nm or less in one direction, the pulse radiation time is 0.31 ns from the above-described relationship between the thermal diffusion distance and the pulse radiation time. In short, it is desirable to execute the short pulse recording with this pulse radiation time.

In this case, as has been described above, the equation (2) is obtained as the relationship between the resonator length L of the semiconductor laser and the obtained relaxation oscillation pulse width Wr. Hence, it is understood that in order to execute the short pulse recording, it is necessary to use the pulse width of 310 ps or less, that is, to use the semiconductor laser with the resonator length of 2480 μm or less.

On the other hand, from the standpoint of the reduction of the recrystallization ring, it is preferable that the pulse radiation time be as short as possible. Actually, however, it is difficult to provide energy for increasing the temperature of the phase-change material up to the melting point or above. In other words, it is necessary to radiate a very high power within a short time. Therefore, actually, the pulse radiation time of about 50 ps or more may be considered to be necessary. If the relationship of the equation (2) is used, this means that the semiconductor laser with the resonator length of 400 μm or more is needed.

As is understood from the equation (2), in the case of using the relaxation oscillation pulse for information recording on the optical disc 1, if the resonator length of the semiconductor laser 20 that is used in the optical recording apparatus is determined, the relaxation oscillation pulse width is uniquely determined. As described above, in the case where the pulse width is short, the temperature of the phase-change material is increased up to the melting point or above by radiating high power. However, there is a case in which the temperature of the phase-change material does not reach the melting point or above, even if the maximum power of the semiconductor laser 20 is radiated In such a case, it is useful to radiate the relaxation oscillation pulse by a plurality of number of times.

Figure 8:
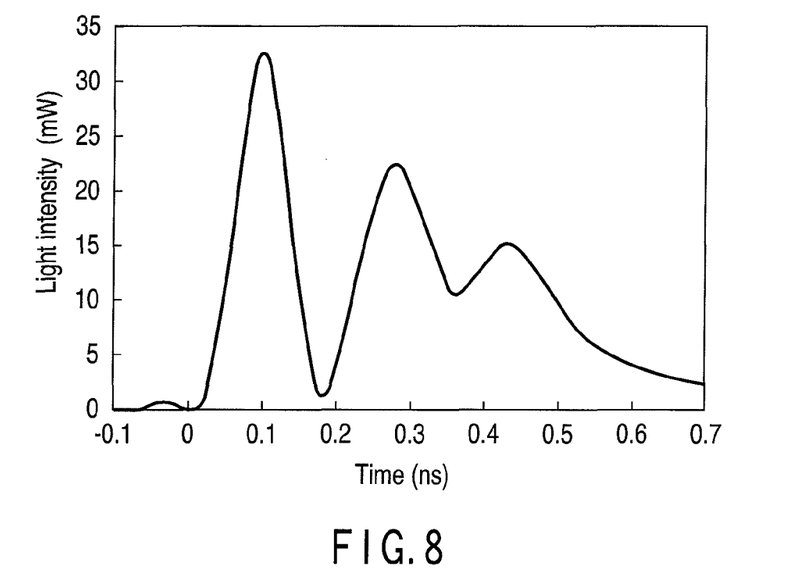
FIG. 8 is a graph showing an example of the optical pulse waveform in the case where a driving pulse of the semiconductor laser is controlled in such a manner as to generate the relaxation oscillation pulse three times.

FIG. 8 shows the optical pulse waveform in the case where a driving pulse of the semiconductor laser 20 is controlled in such a manner as to generate the relaxation oscillation pulse three times. By generating the relaxation oscillation pulse three times, the radiation energy by pulses (the time integration value of the radiation energy by the pulses shown in FIG. 8) increases, and thus the temperature of the phase-change material can be raised up to the melting point or above. However, as is understood from FIG. 8, the light intensities of the second and third pulses gradually decrease, compared to the intensity of the first relaxation oscillation pulse. Thus, the radiation of the pulse by a greater number of times is not remarkably effective.

As described above, in the optical recording apparatus which records data on an optical recording medium by using the relaxation oscillation pulse of the semiconductor laser 20, it is necessary to vary the number of relaxation oscillation pulses in accordance with the resonator length of the laser. Besides, in the case of using a semiconductor laser with a low rated output, too, it is useful to apply the relaxation oscillation pulse by a plurality of number of times.

The present invention is not limited directly to the above-described embodiment. In practice, the structural elements can be modified and embodied without departing from the spirit of the invention. For example, in the above-described embodiment, the rewritable optical disc using the phase-change material is exemplified. The invention is also applicable, for example, to a write-once type (write-once read-many) optical disc.

Various inventions can be made by properly combining the structural elements disclosed in the embodiment. For example, some structural elements may be omitted from all the structural elements disclosed in the embodiment. Furthermore, structural elements in different embodiments may properly be combined.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An optical recording head device comprising:
a light source configured to output a relaxation oscillation optical pulse with a duration between a first time when a first amplitude is half of a peak amplitude of a single pulse and a second time when a second amplitude is half of the peak amplitude of the single pulse 820 ps or shorter;
a driver configured to drive the light source;
an objective lens configured to converge an emitted light from the light source on a recording layer of a recording medium, and to capture a reflected light from the recording layer of the recording medium;
a distributor between the light source and the objective lens, and configured to distribute an incident light; and
a photo-detector configured to detect the reflected light via the distributor,
wherein a resonator length of the light source is 6560 μm or shorter, and the relaxation oscillation pulse with a cycle in a range of between one cycle and three cycles is configured to raise a temperature of the recording layer to a level above a melting point in order to record a mark.

2. The optical recording head device of claim 1, wherein the duration between the first and the second time of the single pulse of the relaxation oscillation optical pulse is 50 ps or longer.

3. An optical recording apparatus comprising:
an optical recording head device comprising a light source configured to output a relaxation oscillation optical pulse with a duration between a first time when a first amplitude is half of a peak amplitude of a single pulse and a second time when a second amplitude is half of the peak amplitude of the single pulse 820 ps or shorter, a driver configured to drive the light source, an objective lens configured to converge an emitted light from the light source on a recording layer of a recording medium, and to capture a reflected light from the recording layer of the recording medium, a distributor placed between the light source and the objective lens, configured to distribute an incident light, and a photo-detector configured to detect the reflected light via the distributor;
an arithmetic module configured to perform an arithmetic operation of a reproduction signal, based on a signal from the photo-detector; and
a controller configured to control the driver and the arithmetic module,
wherein a resonator length of the light source is 6560 μm or shorter, and the relaxation oscillation pulse with a cycle in a range of between one cycle and three cycles is configured to raise a temperature of the recording layer to a level above a melting point in order to record a mark.

4. The optical recording apparatus of claim 3, wherein the duration between the first time and the second time of the single pulse of the relaxation oscillation optical pulse is 50 ps or longer.

5. A recording method by an optical recording apparatus comprising a light source with a resonator length of 6560 μm or less, comprising:
generating a driving current set at a level lower than a threshold level of a current of the light source;
inputting the driving current to the light source, and driving the light source; and
increasing the driving current to a peak current level for a predetermined time, and outputting a relaxation oscillation optical pulse from the light source with a duration between a first time when a first amplitude is half of a peak amplitude of a single pulse and a second time when a second amplitude is half of the peak amplitude of the single pulse 820 ps or shorter,
wherein the increasing and outputting comprise causing the light source to output the relaxation oscillation pulse with a cycle in a range of between one cycle and three cycles of relaxation oscillation, and raising the temperature of the recording layer to a level above a melting point in order to record a mark.

6. The recording method of claim 5, wherein the duration between the first time and the second time of the single pulse of the relaxation oscillation optical pulse from the light source in the increasing and outputting is 50 ps or longer.

* * * * *